United States Patent
Sohn et al.

(10) Patent No.: US 9,075,265 B2
(45) Date of Patent: Jul. 7, 2015

(54) LIQUID CRYSTAL DISPLAY DEVICE AND METHOD OF MANUFACTURING THE SAME

(75) Inventors: Ji-Won Sohn, Seoul (KR); Joo-Seok Yeom, Gwacheon-si (KR); Jeong-Uk Heo, Seongnam-si (KR); Ho-Yun Byun, Hwaseong-si (KR); Jung-Hun Lee, Seoul (KR); Na-Young Shin, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 407 days.

(21) Appl. No.: 12/764,259

(22) Filed: Apr. 21, 2010

(65) Prior Publication Data

US 2011/0025967 A1 Feb. 3, 2011

(30) Foreign Application Priority Data

Jul. 28, 2009 (KR) .................. 10-2009-0069001

(51) Int. Cl.
*G02F 1/1337* (2006.01)
*G02F 1/141* (2006.01)

(52) U.S. Cl.
CPC .... *G02F 1/133711* (2013.01); *G02F 1/133788* (2013.01); *G02F 2001/133726* (2013.01)

(58) Field of Classification Search
CPC ............. G02F 1/133788; G02F 2001/133726
USPC .................................................. 349/123–136
See application file for complete search history.

(56) References Cited

U.S. PATENT DOCUMENTS

| | | | | |
|---|---|---|---|---|
| 5,528,401 A | * | 6/1996 | Narutaki et al. | 349/124 |
| 5,808,716 A | * | 9/1998 | Gass et al. | 349/124 |
| 6,201,588 B1 | * | 3/2001 | Walton et al. | 349/123 |
| 6,690,446 B1 | * | 2/2004 | Okamoto et al. | 349/181 |
| 6,825,892 B2 | * | 11/2004 | Inoue et al. | 349/39 |
| 7,170,575 B2 | * | 1/2007 | Coates et al. | 349/123 |
| 7,638,175 B2 | * | 12/2009 | Kurosawa | 428/1.2 |
| 7,767,108 B2 | * | 8/2010 | Kataoka | 252/299.01 |
| 7,907,247 B2 | * | 3/2011 | Okabe et al. | 349/172 |
| 8,409,674 B2 | * | 4/2013 | Harding et al. | 428/1.2 |
| 2006/0051524 A1 | * | 3/2006 | Gibbons et al. | 428/1.2 |
| 2008/0160222 A1 | * | 7/2008 | Harding et al. | 428/1.26 |
| 2009/0174851 A1 | * | 7/2009 | Chen et al. | 349/128 |
| 2010/0002184 A1 | * | 1/2010 | Son et al. | 349/187 |
| 2010/0103357 A1 | * | 4/2010 | Kye et al. | 349/123 |

OTHER PUBLICATIONS

"Electro-optical characteristics and morphology of a bend nematic liquid crystal device having templated polymer fibrils," by Kim et al, Japanese Journal of Applied Physics, vol. 43, No. 11A, pp. 7643-7647, 2004.*

* cited by examiner

*Primary Examiner* — Robert Tavlykaev
(74) *Attorney, Agent, or Firm* — Cantor Colburn LLP

(57) ABSTRACT

In a method of forming a liquid crystal display device, a black matrix is disposed on a substrate including a switching element formed thereon, a color filter is disposed on the switching element, a pixel electrode is electrically connected to the switching element, and a first alignment layer is disposed on the pixel electrode, to form a first substrate. A second substrate including a second alignment layer is formed. At least one of the first alignment layer and the second alignment layer includes a reactive mesogen. A liquid crystal layer is interposed between the first substrate and the second substrate. A light is irradiated onto the second substrate to provide pretilt angles of liquid crystal molecules of the liquid crystal layer.

17 Claims, 5 Drawing Sheets

LIQUID CRYSTAL DISPLAY DEVICE AND METHOD OF MANUFACTURING THE SAME

This application claims priority to Korean Patent Application No. 2009-69001, filed on Jul. 28, 2009, and all the benefits accruing therefrom under 35 U.S.C. §119, the contents of which are herein incorporated by reference in their entirety.

BACKGROUND OF THE INVENTION

1. Field of the Invention

Exemplary embodiments of the invention relate to a liquid crystal display ("LCD") device, and a method of manufacturing the LCD device. More particularly, exemplary embodiments of the invention relate to a liquid crystal display ("LCD") device capable of enhancing afterimages and reliability, and a method of manufacturing the LCD device.

2. Description of the Related Art

Generally, in a liquid crystal display ("LCD") device, a voltage is applied to an electric field generating electrode to provide the liquid crystal layer with an electric field, and arrangement of liquid crystal molecules of a liquid crystal layer is controlled in response to the electric field, thereby displaying images.

The LCD device may be operated with a super vertical alignment ("S-VA") mode. According to the S-VA technology, liquid crystal molecules and ultraviolet ("UV")-curable particles are injected between first and second substrates, and the UV-curable particles are cured to pretilt the liquid crystal molecules under conditions in which a data voltage of a white gray scale is applied between the first and second substrates.

Polarized ultraviolet light is irradiated to photocrosslinkable copolymer including a mesogenic group having liquid crystal properties, the mesogenic group being referred as a reactive mesogen ("RM"), to induce anisotropy to the photocrosslinkable copolymer, and heat is applied to the photocrosslinkable copolymer to enhance the anisotropy of an alignment layer, to thereby align liquid crystal molecules.

However, the RM injected between first and second substrates may not be easily cured at a surface of the alignment layer, and the RM may remain in the liquid crystal layer. The RM remaining in the liquid crystal layer may be cured by light from a backlight of the LCD device, and cured amounts of the RM differ depending on location. Thus, pretilt angles of liquid crystal molecules may not be uniform. As a result, afterimages may appear on a display screen.

BRIEF SUMMARY OF THE INVENTION

Exemplary embodiments of the invention provide a liquid crystal display ("LCD") device having improved afterimages and reliability.

Exemplary embodiments of the invention also provide a method of manufacturing the LCD device.

According to an exemplary embodiment of the invention, there is provided a method of manufacturing an LCD device. In the method, a black matrix is disposed on a substrate including a switching element disposed thereon, a color filter is disposed on the switching element, a pixel electrode is electrically connected to the switching element, and a first alignment layer is disposed on the pixel electrode, to form a first substrate. A second substrate including a second alignment layer is formed. The second substrate faces the first substrate. At least one of the first alignment layer and the second alignment layer includes a reactive mesogen ("RM"). A liquid crystal layer is interposed between the first substrate and the second substrate. A light is irradiated onto the second substrate to provide pretilt angles of liquid crystal molecules of the liquid crystal layer.

In an exemplary embodiment of the invention, the reactive mesogen ("RM") may be cured by irradiating the light.

In an exemplary embodiment of the invention, at least one of the first alignment layer and the second alignment layer may include at least one selected from the group consisting of polyamic acid, polyimide, and polysiloxane.

In an exemplary embodiment of the invention, at least one of the first alignment layer and the second alignment layer may include an initiator to promote a curing reaction of the reactive mesogen.

In an exemplary embodiment of the invention, the reactive mesogen ("RM") may include a compound represented by the following Chemical Formula 1:

$$Y_1\text{-}A_1\text{-}Y_2 \qquad \text{<Chemical Formula 1>}$$

where each of $Y_1$ and $Y_2$ represents an acrylate group or a methacrylate group, $A_1$ represents a biphenyl group, a terphenyl group, or a naphthalene group, and each hydrogen atom of $A_1$ is replaceable with F, Cl, $CH_3$, or $OCH_3$.

In an exemplary embodiment of the invention, at least one of the first alignment layer and the second alignment layer may include about 0.1 percent by weight to about 20 percent by weight of the reactive mesogen ("RM") based on a total weight of the first alignment layer or the second alignment layer.

In an exemplary embodiment of the invention, the initiator may include at least one selected from the group consisting of benzyl dimethyl ketal, α-amino acetophenone, and 1-hydroxy cyclohexyl phenyl keton.

In an exemplary embodiment of the invention, at least one of the first alignment layer and the second alignment layer may include about 0.01 percent by weight to about 1 percent by weight of the initiator based on a total weight of the reactive mesogen ("RM").

In an exemplary embodiment of the invention, in irradiating the light onto the second substrate, about 0.01 joule (J) to about 10 J of an unpolarized UV light may be irradiated at a condition in which an electric field is applied to the liquid crystal layer.

In an exemplary embodiment of the invention, about 15 J to about 100 J of an unpolarized UV light may be further irradiated at a condition in which an electric field is not applied to the liquid crystal layer, after irradiating the unpolarized UV light at a condition in which an electric field is applied to the liquid crystal layer.

In an exemplary embodiment of the invention, about 0.1 J to about 1 J of an unpolarized UV light may be further irradiated at a condition in which an electric filed is not applied to the liquid crystal layer, before irradiating the unpolarized UV light at a condition in which an electric field is applied to the liquid crystal layer.

According to another exemplary embodiment of the invention, an LCD device includes a first substrate including a black matrix disposed on a substrate including a switching element disposed thereon, a color filter disposed on the switching element, a pixel electrode electrically connected to the switching element and a first alignment layer disposed on the pixel electrode, a second substrate including a common electrode facing the pixel electrode, and a second alignment layer disposed on the common electrode, the second substrate facing the first substrate, at least one of the first alignment layer and the second alignment layer including a reactive mesogen ("RM"), and a liquid crystal layer interposed between the first substrate and the second substrate and including liquid crystal molecules at pretilt angles.

In an exemplary embodiment of the invention, the reactive mesogen ("RM") may be cured by irradiating a light onto the second substrate.

In an exemplary embodiment of the invention, the pixel electrode may include a first pixel electrode and a second pixel electrode to receive different pixel voltages respectively.

In an exemplary embodiment of the invention, the first alignment layer and the second alignment layer including the cured mesogen may be configured to arrange a long axis of liquid crystal molecules of the liquid crystal layer in a perpendicular direction with respect to the substrate when an electric field is not applied to the liquid crystal layer.

In an exemplary embodiment of the invention, the liquid crystal molecules may be tiled by the first alignment layer and the second alignment layer when an electric field is applied to the liquid crystal layer.

According to the invention, a reactive mesogen ("RM") and an initiator are mixed with an alignment layer, not a liquid crystal. Thus, reliability deterioration by elution of remaining RM may be decreased, so that display quality may be improved.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
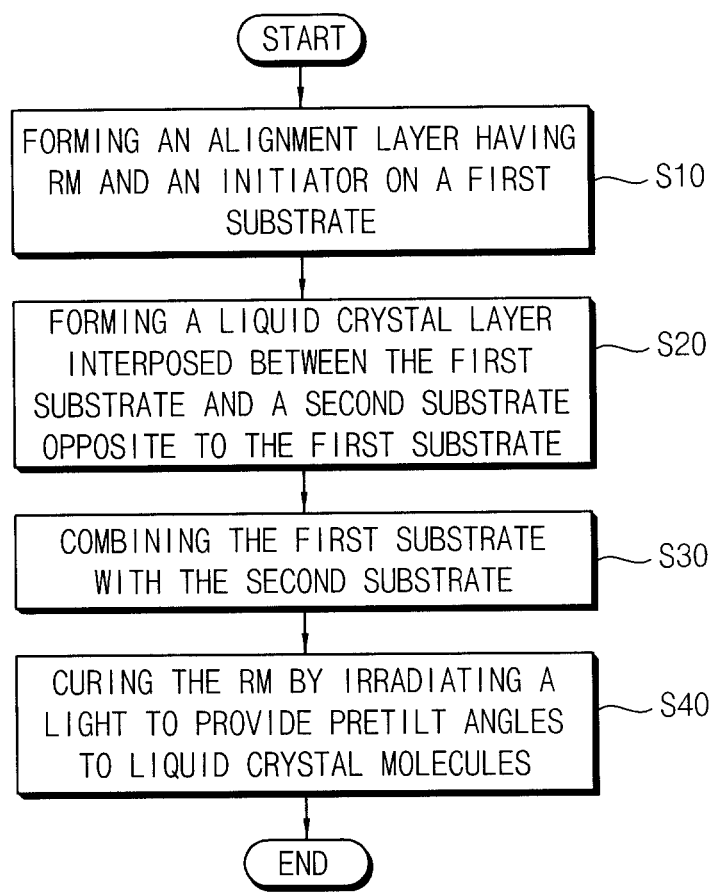
FIG. 1 is a flowchart illustrating an exemplary embodiment of a method of manufacturing a liquid crystal display ("LCD") device, according to the invention.

The invention is described more fully hereinafter with reference to the accompanying drawings, in which exemplary embodiments of the invention are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

FIG. 1 is a flowchart illustrating an exemplary embodiment of a method of manufacturing a liquid crystal display ("LCD") device according to the invention.

Referring to FIG. 1, an alignment layer including a reactive mesogen ("RM") and an initiator, is formed on a first substrate including a pixel electrode including a microslit portion which determines an alignment direction of liquid crystal (step S10). A liquid crystal layer is interposed between the first substrate and a second substrate (step S20). The first substrate is combined with the second substrate so that the first and second substrates face each other (step S30). A light is irradiated to the liquid crystal layer to cure the RM of the alignment layer, so as to provide a pretilt angle to the liquid crystal (step S40).

Figure 2:
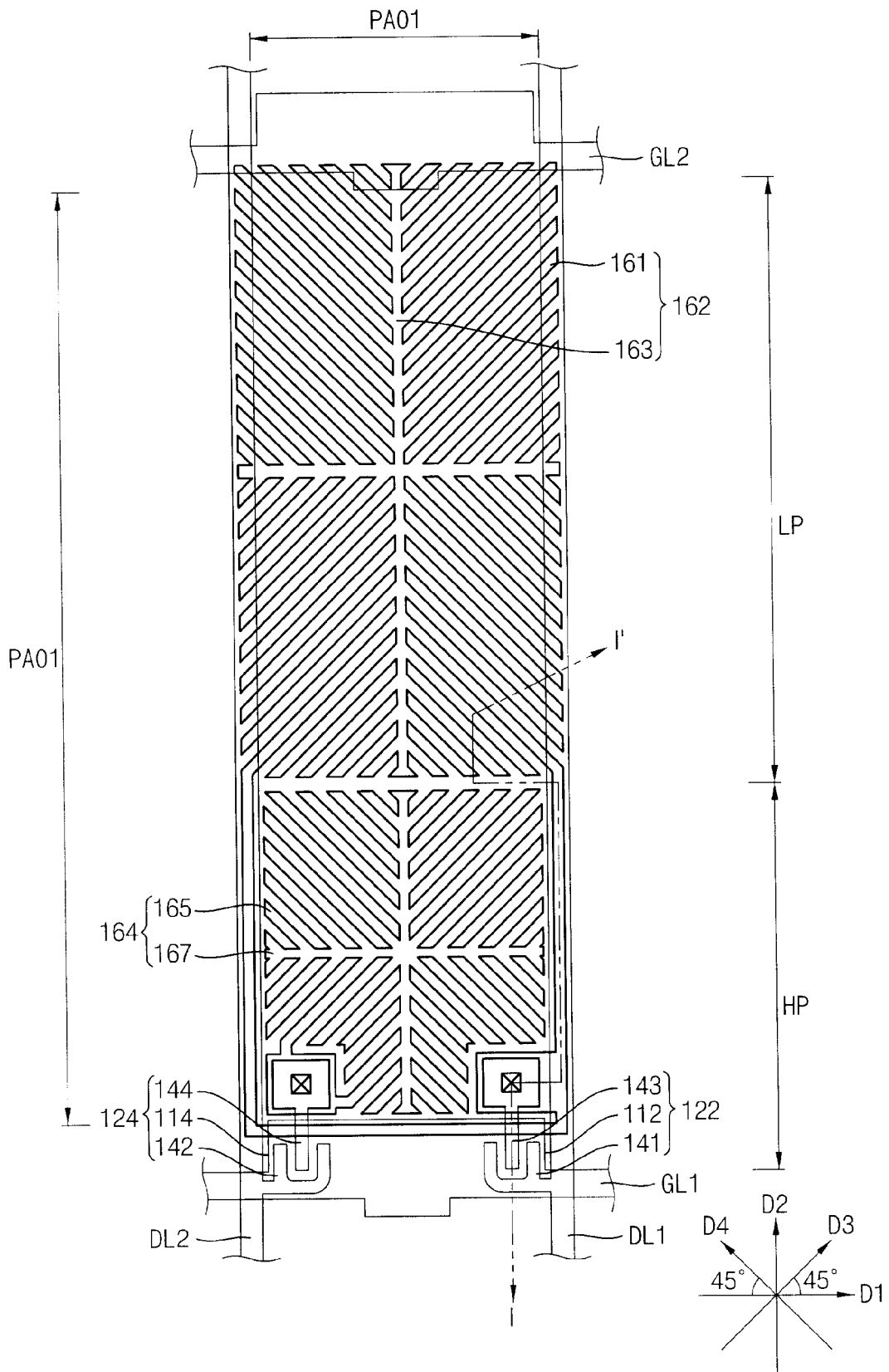
FIG. 2 is a plan view illustrating an exemplary embodiment of a first substrate of the LCD device, according to the invention.
Figure 3:
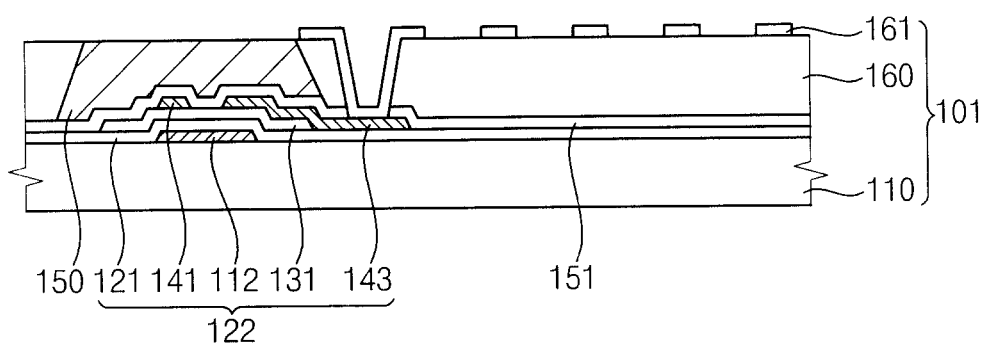
FIG. 3 is a cross-sectional view taken along line I-I' of the first substrate of FIG. 2.

FIG. 2 is a plan view illustrating an exemplary embodiment of a first substrate of the LCD device according to the invention. FIG. 3 is a cross-sectional view taken along line I-I' of the first substrate of FIG. 2.

Referring to FIGS. 2 and 3, an LCD device according to the invention includes a first substrate 101, a second substrate (not shown) facing the first substrate 101, and a liquid crystal layer (not shown) interposed between the first substrate 101 and the second substrate. A plurality of pixel electrodes 162 and 164 is disposed on a unit pixel area PA01 of the LCD device, and the pixel electrodes 162 and 164 receive pixel voltages that are different from each other.

The pixel electrodes 162 and 164 include a plurality of a microslit portion 161 and 165, respectively, in order to enhance a viewing angle by varying alignment directions of liquid crystal molecules. An alignment layer including a RM and an initiator is disposed on the pixel electrodes 162 and 164 and/or a common electrode of the second substrate, in order to enhance the response time of liquid crystal, where the liquid crystal is aligned to have a pretilt angle through ultraviolet ("UV") light curing of the RM of the alignment layer.

The pixel electrodes 162 and 164 are disposed on the unit pixel area PA01. One of the pixel electrodes 162 and 164, to which a high pixel voltage is applied, may be denoted as a main pixel electrode, and the other of the pixel electrodes, to which a low pixel voltage is applied, may be denoted as a sub-pixel electrode. In the illustrated embodiment, the main pixel electrode corresponds to a first pixel electrode 162, and the sub-pixel electrode corresponds to a second pixel electrode 164.

The first and second pixel electrodes 162 and 164 are electrically connected to a same gate line GL1, and are electrically connected to different data lines DL1 and DL2, respectively. Thus, a pixel of the LCD device is driven by one gate line and two data lines ("1G2D") method.

In the illustrated embodiment, a switching part includes a first switching element 122 and a second switching element 124. The first switching element 122 electrically connects the first pixel electrode 162 to the gate line GL1 and a first data line DL1. The second switching element 124 electrically connects the second pixel electrode 164 to the gate line GL1 and a second data line DL2.

Pixel voltages having different levels may be applied to the first and second pixel electrodes 162 and 164, respectively. In one exemplary embodiment, a first pixel voltage applied to the first pixel electrode 162 is higher than a second pixel voltage applied to the second pixel electrode 164. Alternatively, a first pixel voltage applied to the first pixel electrode 162 may be lower than a second pixel voltage applied to the second pixel electrode 164. When levels of the first and second pixel voltages are appropriately adjusted, an image viewed from a side of a display screen of the LCD device, may have, display characteristics close to an image viewed from the front of the display screen of the LCD device. Moreover, a display quality may be substantially uniform independently from the viewing angle, so that the side visibility of the LCD device may be enhanced.

The first substrate 101 includes the gate lines GL1 and GL2, the data lines DL1 and DL2, a plurality storage lines (not shown), the first and second switching elements 122 and 124, a black matrix 150, a color filter 160, the first and second pixel electrodes 162 and 164, and the first alignment layer (not shown).

The first substrate according to the invention has a black matrix on array ("BOA") structure including the black matrix and the color filter, which are disposed on an array substrate. The BOA structure may cover (e.g., overlap) an area covered by a metal line or a black matrix where a RM does not react when an UV light is irradiated to the substrate. The second substrate of the invention includes a transparent common electrode so that an entire surface of a substrate may be exposed to an UV light.

In an exemplary embodiment of a method of forming a first substrate and referring to FIGS. 1 and 2, a gate metal is deposited on a first base substrate 110 including, for example, a glass material, and then the deposited gate metal is etched to form the gate lines GL1 and GL2. The gate lines GL1 and GL2 are formed on the first base substrate 110 longitudinally extended in parallel with a row direction D1. A portion of the gate line GL1 forms a gate electrode 112 having a protruding shape, where the gate electrode 112 extends from a main portion of the gate line GL1. The gate line GL1 which includes the gate electrode 112, is a unitary indivisible member of the first substrate 101. A gate insulation layer 121 is formed on the gate lines GL1 and GL2.

In the method of forming the first substrate, a semiconductor layer and a source metal layer are sequentially formed on the gate insulation layer 121, and are etched to form the data lines DL1 and DL2, a source electrode 141, a channel layer 131, and a drain electrode 143. The data lines DL1 and DL2 are longitudinally extended in a substantially column direction D2, on the gate insulation layer 121. The source electrode 141 is extended from the first data line DL1 adjacent to a crossing area of the gate line GL1 and the data line DL1, and the source electrode 141 is overlapped with a portion of the gate electrode 112. A portion of the drain electrode 143 adjacent to the source electrode 141 is disposed to overlap with the gate electrode 112, and a portion of the drain electrode 143 is extended toward the unit pixel area PA01. The source electrode 141 extends from a main portion of the data line DL1.

The data line DL1 which includes the source electrode 141, is a unitary indivisible member of the first substrate 101.

The gate lines GL1 and GL2 and the data lines DL1 and DL2 cross with each other to define a substantially rectangular region, and the first and second pixel electrodes 162 and 164 are disposed on the rectangular shaped region. In the illustrated embodiment, the rectangular region may be defined as the unit pixel area PA01. Alternatively, the unit pixel area PA01 may have various shapes such as a Z-shape.

The gate electrode 112, the gate insulation layer 121, the channel layer 131, the source electrode 141, and the drain electrode 143 define the first switching element 122 including three terminals. The second switching element 124 may include a gate electrode 114, a gate insulation layer 121, the channel layer 131, a source electrode 142, and a drain electrode 144.

In the method of forming the first substrate, a passivation layer 151 covering (e.g., overlapping an entire of) the date line DL1 is formed.

The black matrix 150 is formed on the first base substrate including the gate lines GL1 and GL2, the data lines DL1 and DL2, the first and second switching elements 122 and 124 and the passivation layer 151 formed thereon. The black matrix 150 shields a light passing through the first substrate 101 to be applied to the liquid crystal layer.

The color filter 160 is disposed directly on the passivation layer 151. The color filter 160 may include a first color filter, a second color filter, and a third color filter. The first, second, and third color filters represent different colors, respectively. In one exemplary embodiment, the first color filter may represent a red color, the second color filter may represent a blue color, and the third color filter may represent a green color.

A contact hole is formed extending completely through the color filter 160 and the passivation layer 151, to expose a portion of the drain electrode 143.

An optically transparent and electrically conductive material layer such as indium tin oxide ("ITO"), indium zinc oxide ("IZO"), etc., is deposited on the color filter 160. The optically transparent and electrically conductive material layer makes contact with the drain electrode 143 through the contact hole. The optically transparent and electrically conductive material layer is etched to form the first and second pixel electrodes 162 and 164.

In the illustrated embodiment, in order to enhance a viewing angle, a viewing angle enhancing technology may be applied to the first and second pixel electrodes 162 and 164. In one exemplary embodiment, a technology dividing a pixel area into a plurality of domains having different alignment directions, may be employed in the unit pixel area PA01.

In one exemplary embodiment, in order to form the domains, the first and second pixel electrodes 162 and 164 may respectively include a plurality of supporting electrodes 163 and 167, and a plurality of microslit portions 161 and 165. Portions of the supporting electrodes 163 and 167 may be disposed to be respectively parallel to the row direction D1 and the column direction D2, such that each of the supporting electrodes 163 and 167 has a cross shape. Each of the microslit portions 161 and 165 may be respectively extended along a first oblique line direction D3 and a second oblique line direction D4, which are inclined with respect to the row direction D3 and the column direction D3 by an angle of about 45 degrees. Each of the microslit portions 161 and 165 may be formed to have different extended directions in each of domains. The microslit portions 161 and the supporting electrodes 163 collectively form a unitary indivisible first pixel electrode 162. Similarly, the microslit portions 165 and the supporting electrodes 167 collectively form a unitary indivisible second pixel electrode 164.

Figure 4:
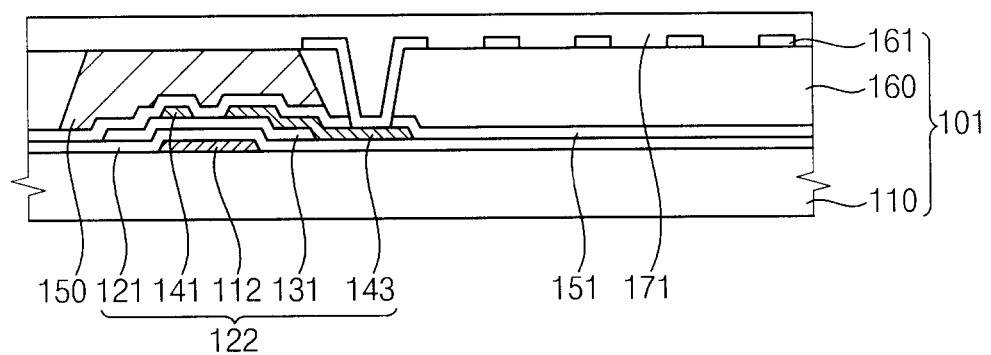
FIG. 4 is a cross-sectional view illustrating an exemplary embodiment of a process for forming a first alignment layer on the first substrate of FIG. 3.

FIG. 4 is a cross-sectional view illustrating an exemplary embodiment of a process for forming a first alignment layer on the first substrate of FIG. 3.

Referring to FIG. 4, a first alignment layer 171 covering the first and second pixel electrodes 162 and 164 is formed. The first alignment layer 171 overlaps an entire of the first base substrate 110 and forms an uppermost layer of the first substrate 101. The first alignment layer 171 is coated on the first and second pixel electrodes 162 and 164, and then cured. A material that may be used for the first alignment layer 171 may include a polyimide compound, a polyamic acid compound, a polysiloxane compound, a polyvinyl cinnamate compound, a polyacrylate compound, a polymethacrylate compound and the like. The first alignment layer 171 may preferably include a polyimide compound, a polyamic acid, a polysiloxane compound and the like. These aforementioned materials can be used alone or in a combination thereof.

The first alignment layer 171 may include an RM and an initiator.

A mesogen is defined as a photocrosslinkable copolymer including a mesogenic group having liquid crystal properties. The anisotropy of the mesogen is induced by irradiating polarized UV light to the mesogen, and the orientation of the mesogen is enhanced through a heat treatment. The mesogenic group has liquid crystal properties in a specific temperature range or in a specific solution. The RM may include a material or a compound, which is capable of inducing a liquid crystal phase reaction, and may have a shape of, for example, a bar, a banana, a board and a disk. In one exemplary embodiment, the RM may include a reactive group such as acrylate, methacrylate, epoxy, oxetane, vinyl-ether, styrene, thiol-ene, etc.

The RM may include a compound represented by the following Chemical Formula 1.

$$Y_1-A_1-Y_2 \qquad \text{<Chemical Formula 1>}$$

In the above chemical formula, each of $Y_1$ and $Y_2$ represents an acrylate group or a methacrylate group, $A_1$ represents a biphenyl group, a terphenyl group, or a naphthalene group, and each hydrogen atom of $A_1$ may be replaced with F, Cl, $CH_3$, or $OCH_3$.

Examples of a material that may be used for the RM may include compounds represented by the following Chemical Formulas 2 to 8. However, the RM should not be construed as limited to the examples set forth herein.

<Chemical Formula 2>

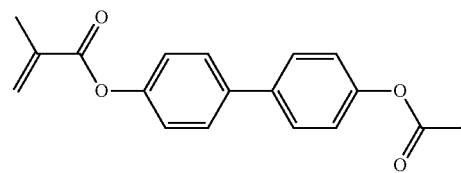

<Chemical Formula 3>

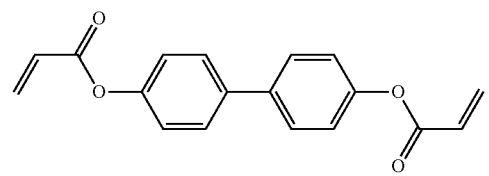

-continued

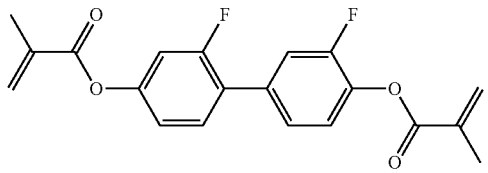
<Chemical Formula 4>

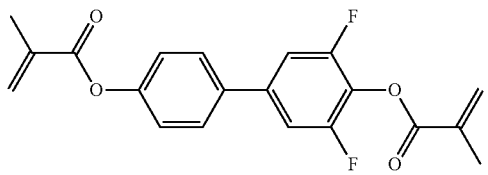
<Chemical Formula 5>

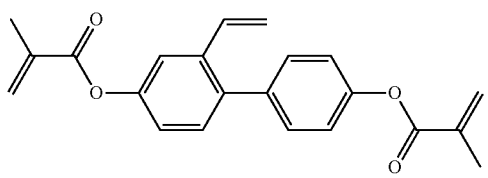
<Chemical Formula 6>

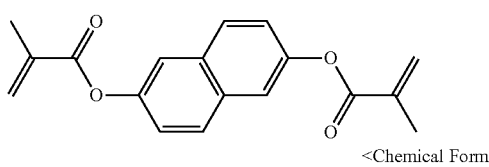
<Chemical Formula 7>

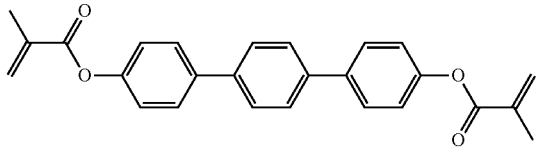
<Chemical Formula 8>

The content of the RM may be about 0.1% to about 20% by weight based on the respective total weight of the first alignment layer, or a second alignment layer. When the content of the RM is less than about 0.1% by weight, the RM may not function in forming an alignment layer. When the content of the RM is greater than about 20% by weight, liquid crystal molecules having a pretilt angle may be excessively increased.

The initiator is used to promote a curing reaction of the RM. The initiator includes a material having a wavelength between about 300 nanometers (nm) and about 400 nanometers (nm). The initiator of the invention absorbs an UV light having a long wavelength range of about 365 nm, to be decomposed into a radical so that photopolymeriation reaction is promoted. When an alignment layer includes the initiator, photopolymeriation reaction may be promoted by UV light having a long wavelength range. Thus, an UV light having a short wavelength range fatal to other organic materials, may not be used to reduce or effectively prevent damage to the organic materials.

Examples of the initiator may include benzyl dimethyl ketal (Irgacure-651, Ciba, Switzerland), α-amino acetophenone (Irgacure-907, Ciba, Switzerland), 1-hydroxy cyclohexyl phenyl keton (Irgacure-184, Ciba, Switzerland) and the like. These materials can be used alone or in a combination thereof.

The content of the initiator may be about 0.01% by weight to about 1% by weight based on the total weight of the RM. When the content of the initiator is less than about 0.01% by weight, a reactivity of the initiator is insignificant. When the content of the initiator is greater than about 1% by weight, the initiator functions as impurities to induce afterimages.

According to the invention, the RM and the initiator of the alignment layer material are not mixed with the liquid crystal molecules, but are cured by the UV light to form the first alignment layer 171 and the second alignment layer (not shown). Thus, reliability deterioration by elution of remaining RM may be decreased.

Figure 5:
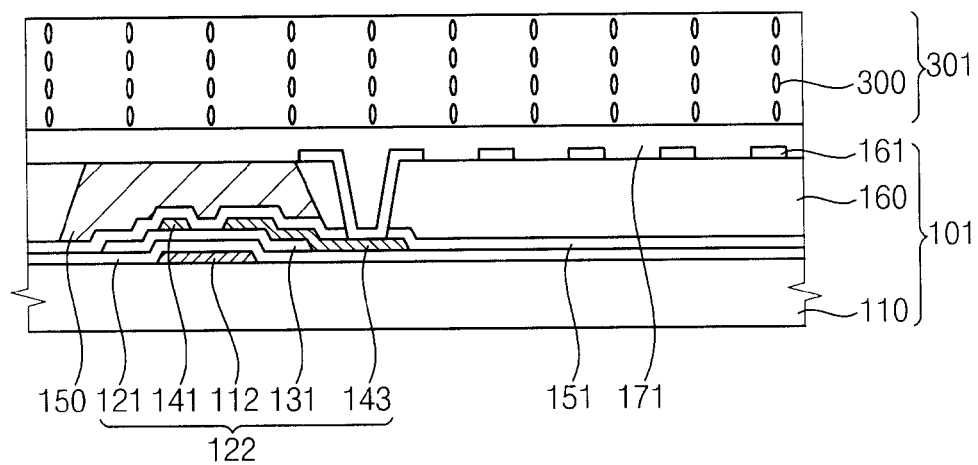
FIG. 5 is a cross-sectional view illustrating an exemplary embodiment of a process for forming a liquid crystal layer on the first alignment layer.

FIG. 5 is a cross-sectional view illustrating an exemplary embodiment of a process for forming a liquid crystal layer on the first alignment layer 171.

Referring to FIG. 5, a liquid crystal 300 is dropped on the first alignment layer 171 including the RM and the initiator, to form a liquid crystal layer 301.

Figure 6:
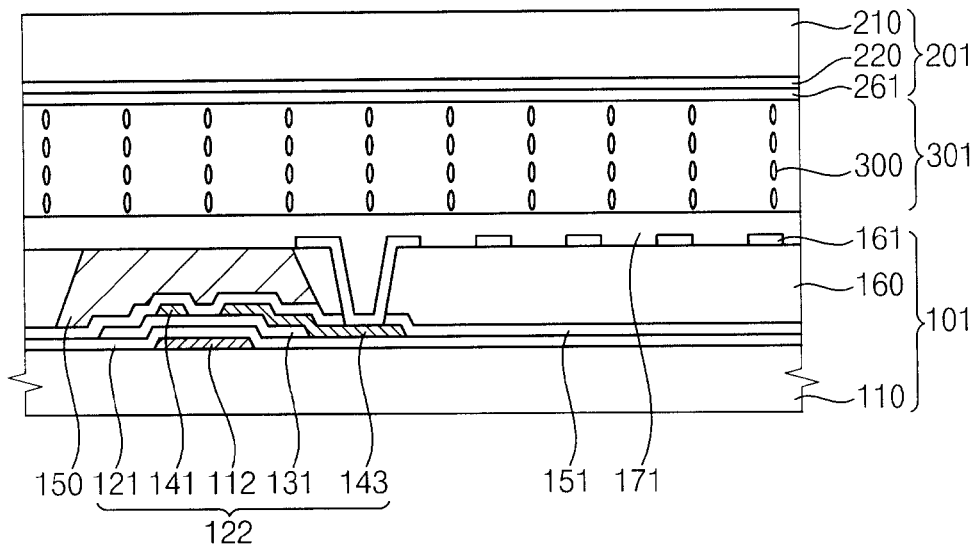
FIG. 6 is a cross-sectional view illustrating an exemplary embodiment of a process for combining the first substrate including the liquid crystal layer disposed thereon, and a second substrate.

FIG. 6 is a cross-sectional view illustrating an exemplary embodiment of a process for combining the first substrate 101 including the liquid crystal layer 301 formed thereon, and a second substrate.

Referring to FIG. 6, the second substrate 201 includes a second base substrate 210, a common electrode 220, and a second alignment layer 261. The common electrode 220 may include substantially the same material as the first and second pixel electrodes 162 and 164. The common electrode 220 may be a single continuous layer (e.g., unitary and indivisible) not including slit portions.

The second alignment layer 261 is formed on the common electrode 220, and forms a lowermost layer of the second substrate 201. The second alignment layer 261 may include substantially the same material as the first alignment layer 171. The second alignment layer 261 including the RM and the initiator, may be formed by a process identical to a process for forming the first alignment layer 171.

Before an electric field is applied between the first and second pixel electrodes 162 and 164, and the common electrode 250, a long axis direction of liquid crystal 300 (hereinafter referred to as a director of liquid crystal) may be substantially perpendicular to the first substrate 101 and the second substrate 201.

Figure 7:
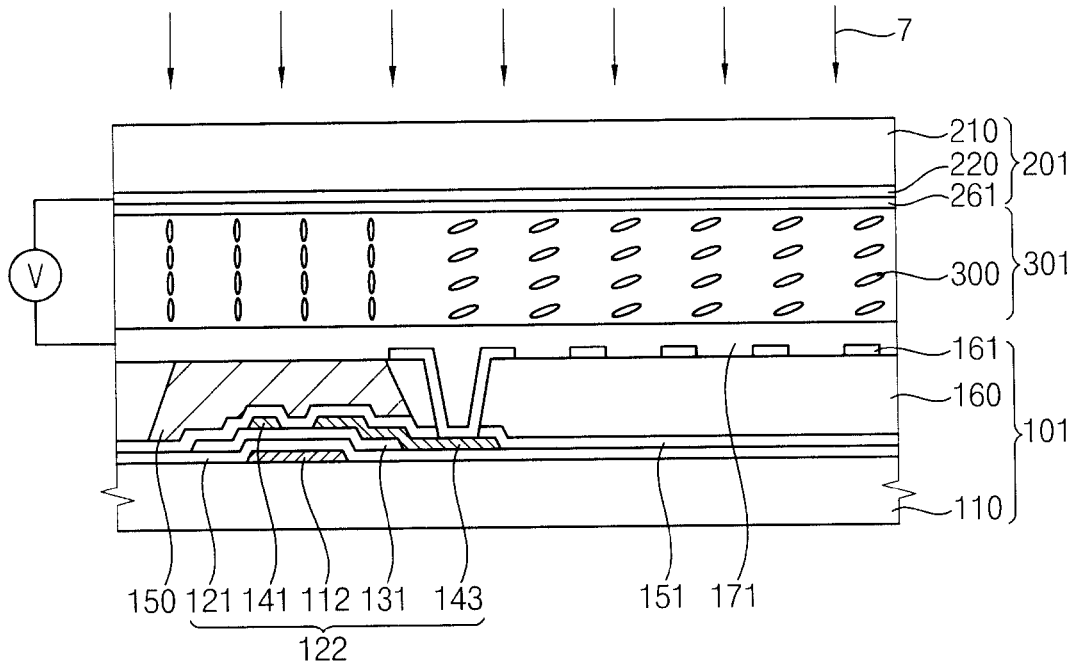
FIGS. 7 and 8 are cross-sectional views illustrating an exemplary embodiment of a process for providing pretilt angles of liquid crystal molecules.
Figure 8:
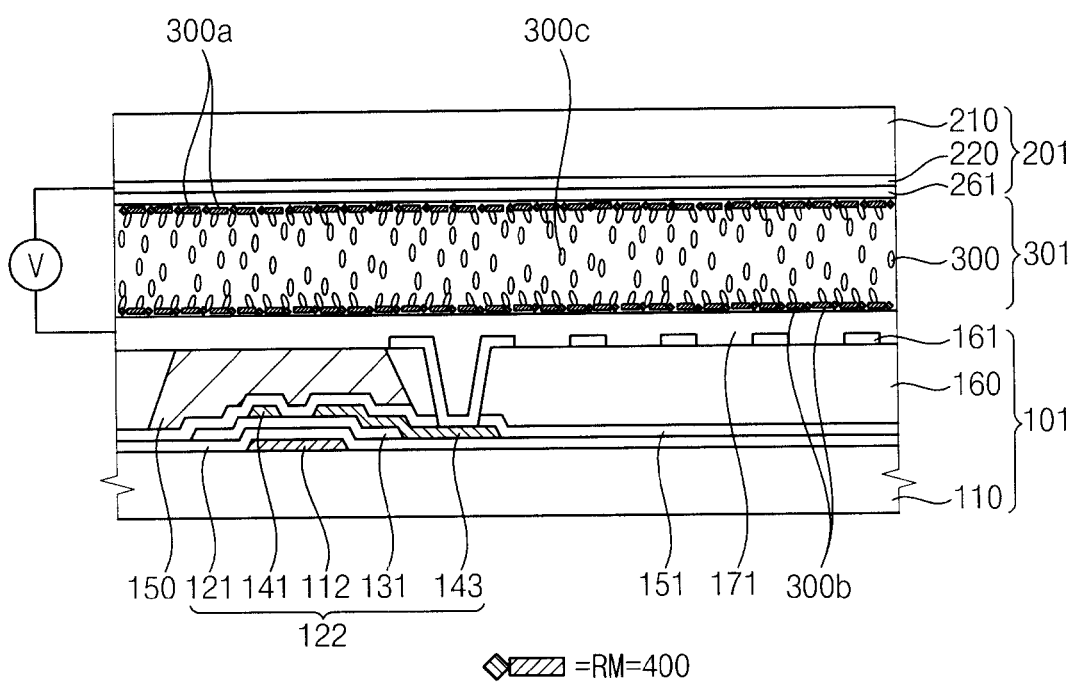

FIGS. 7 and 8 are cross-sectional views illustrating an exemplary embodiment of a process for providing pretilt angles of liquid crystal molecules.

When a respective pixel voltage is applied to the first and second pixel electrodes 162 and 164, and when a common voltage is applied to the common electrode 220, the director of the liquid crystal 300 is tilted to be parallel to the horizontal direction (e.g., parallel to a plane of the first substrate 101 and the second substrate 201). In order to fully tilt the director of the liquid crystal 300 to be parallel, the pixel voltage and the common voltage may be increased, or may be decreased gradually.

Referring to FIG. 7, about 0.1 joule (J) to about 10 J of an unpolarized UV light 7 is irradiated directly onto the second substrate 201 at a condition in which an electric field is applied to the liquid crystal layer 301. The RM of the first and second alignment layers 171 and 261 is cured in response to the unpolarized UV light 7, and determines the directionality of the liquid crystal 300 directly adjacent to the cured RM.

Referring to FIG. 8, the liquid crystals 300a and 300b adjacent to the cured RM 400 of a surface of the first and second alignment layers 171 and 261, respectively, may be pre-arranged in the horizontal direction or pre-arranged at an inclined angle with respect to surfaces of the cured RM 400. Thus, when an electric field is not applied to the liquid crystal layer 301, liquid crystals 300 may be arranged as shown in FIG. 8. In exemplary embodiments, liquid crystals 300a and 300b are aligned in a horizontal direction or have an inclined angle with respect to surfaces of the cured RM 400 of the first and second alignment layers 171 and 261. The liquid crystal 300c disposed farther from the cured RM 400 is gradually arranged perpendicular with respect to surfaces of the cured RM 400 and planes of the first substrate 101 and the second substrate 201.

In the illustrated embodiments described above, RM is easily cured at a surface of the alignment layer. Additionally, the cured RM is not mixed with the liquid crystal layer and does not remain in the liquid crystal layer. Thus, pretilt angles of liquid crystal molecules of the liquid crystal layer may be substantially uniform.

Due to the determined directionality arrangement of the liquid crystal 300, the response time of the liquid crystal 300 may be improved. Moreover, arrangement directions of the liquid crystal are various, so that a viewing angle may be enhanced.

According to another exemplary embodiment, after irradiating about 0.1 J to about 10 J of an unpolarized UV light 7 on the second substrate 201 at a condition in which an electric field is applied to the liquid crystal layer 301, about 15 J to about 100 J of an unpolarized UV light 7 may be irradiated on the second substrate 201 at a condition in which an electric field is not applied to the liquid crystal layer 301.

Due to further irradiating an unpolarized UV light 7 on the second substrate 201 at a condition in which an electric field is not applied to the liquid crystal layer 301 after irradiating an unpolarized UV light at a condition in which an electric field is applied to the liquid crystal layer, unreacted RM of the uncured first and second alignment layers 171 and 261 may be removed, so that the content of remaining RM 400 after curing may be reduced to be less than about 3% by weight based on the respective total weight of the first alignment layer 171, or the second alignment layer 261.

According to still another exemplary embodiment, about 0.1 J to about 1 J of an unpolarized UV light 7 is irradiated on the second substrate 201 at a condition in which an electric field is not applied to the liquid crystal layer. Then, about 0.1 J to about 10 J of an unpolarized UV light 7 is irradiated at a condition in which an electric field is applied to the liquid crystal layer 301, and then, about 15 J to about 100 J of an unpolarized UV light 7 may be irradiated on the second substrate 201 at a condition in which an electric field is not applied to the liquid crystal layer 301.

Due to further irradiating an unpolarized UV light 7 on the second substrate 201 at a condition in which an electric field is not applied to the liquid crystal layer 301 before irradiating an unpolarized UV light 7 at a condition in which an electric field is applied to the liquid crystal layer, an RM in the uncured first and second alignment layers 171 and 261 having high reactivity is firstly reacted to reduce or effectively prevent afterimages, so that uniformity of a display device may be improved.

The RM of the uncured first and second alignment layers 171 and 261 is cured to determine the directionality of the liquid crystal 300 adjacent to the cured RM 400 by irradiating an unpolarized UV light 7 at a condition in which an electric field is applied to the liquid crystal layer 301. Then, unreacted RM of the uncured first and second alignment layers 171 and 261 is removed by irradiating an UV light 7 at a condition in which an electric field is not applied to the liquid crystal layer 301 so that the content of remaining RM after curing may be reduced by less than about 3% by weight based on the respective total weight of the first alignment layer 171, or the second alignment layer 261.

According to the illustrated embodiments of an LCD device and a method of manufacturing the LCD device of the invention, an alignment layer including a RM and an initiator may be employed to provide pretilt angles of liquid crystal molecules in a display device having a BOA structure. Thus, afterimages due to a remaining RM in a display screen may be prevented or reduced, so that display quality may be improved.

An LCD device structure including the liquid crystal molecules at pretilt angles, may be formed by forming an alignment layer including a RM and an initiator. The liquid crystal molecules at pretilt angles of a final LCD device is considered a structural characteristic of the final LCD device. Since the liquid crystal molecules at pretilt angles is imparted by the formed alignment layer having specific material characteristics during a manufacturing process, such manufacturing process of forming the alignment layer is considered to impart the distinct structural characteristic of the liquid crystal molecules at pretilt angles in the final LCD device.

Since the liquid crystal molecules at pretilt angles in the LCD device is imparted by forming an alignment layer including the RM and the initiator, through disposing an alignment layer material including uncured RM and the initiator on a base substrate, disposing a liquid crystal layer on the formed alignment layer material, thereby forming an LCD structure including the alignment layer material and the liquid crystal layer, and curing the alignment layer material of the LCD structure, such a process is considered as imparting the distinct structural characteristic of the liquid crystal molecules at pretilt angles in the final LCD device.

Additionally, since the liquid crystal molecules at pretilt angles in the LCD device is imparted by curing the alignment layer material of the LCD structure to form cured RM not mixed with liquid crystal molecules of the liquid crystal layer, through irradiating a UV light onto the LCD structure including the alignment layer material and the liquid crystal layer disposed thereon, where directionality (e.g., pretilt) of the liquid crystal directly adjacent to the cured RM is thereby determined, such a process is also considered as imparting the distinct structural characteristic of the liquid crystal molecules at pretilt angles in the final LCD device.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of manufacturing a liquid crystal display (LCD) device, the method comprising:

forming a first substrate comprising:
a black matrix disposed on a base substrate including a switching element disposed thereon,
a color filter disposed on the switching element,
a pixel electrode electrically connected to the switching element, and
a first alignment material layer disposed on the pixel electrode;
forming a second substrate comprising:
a second alignment material layer, the second substrate facing the first substrate,
wherein at least one of the first and second alignment material layers comprises a reactive mesogen;
forming a liquid crystal layer interposed between the first substrate and the second substrate; and
irradiating a light onto the second substrate and onto the liquid crystal layer between the first substrate and the second substrate, to form from the at least one of the alignment material layers comprising the reactive mesogen,
an alignment layer comprising unreacted reactive mesogen therein, and
a cured reactive mesogen layer disposed on an entirety of and outside of the formed alignment layer comprising the unreacted reactive mesogen therein,
wherein the cured reactive mesogen layer disposed outside the formed alignment layer determines directionality of the liquid crystal layer directly adjacent thereto different from directionality of the liquid crystal layer further therefrom under a condition when no electric field is applied to the liquid crystal layer after forming the cured reactive mesogen layer,
wherein
the cured reactive mesogen layer is separate from the liquid crystal layer after the light is irradiated onto the second substrate and onto the liquid crystal layer between the first substrate and the second substrate, and provides pretilt angles of liquid crystal molecules of the liquid crystal layer, and
the irradiating the light onto the second substrate and onto the liquid crystal layer comprises:
first irradiating the light at a condition in which an electric field is applied to the liquid crystal layer, and
second irradiating the light at a condition in which an electric field is not applied to the liquid crystal layer, after the first irradiating.

2. The method of claim 1, wherein at least one of the first alignment layer and the second alignment layer comprises at least one selected from the group consisting of polyamic acid, polyimide, and polysiloxane.

3. The method of claim 1, wherein at least one of the first alignment material layer and the second alignment material layer comprises an initiator to promote a curing reaction of the reactive mesogen.

4. The method of claim 3, wherein the initiator comprises at least one selected from the group consisting of benzyl dimethyl ketal, α-amino acetophenone, and 1-hydroxy cyclohexyl phenyl keton.

5. The method of claim 1, wherein the reactive mesogen comprises a compound represented by the following Chemical Formula 1, $$Y_1\text{-}A_1\text{-}Y_2 \qquad \text{<Chemical Formula 1>}$$

wherein each of $Y_1$ and $Y_2$ represents an acrylate group or a methacrylate group, A1 represents a biphenyl group, a terphenyl group, or a naphthalene group, and each hydrogen atom of A1 is replaceable with F, Cl, CH3, or OCH3.

6. The method of claim 5, wherein at least one of the first alignment layer and the second alignment layer comprises about 0.1 percent by weight to about 20 percent by weight of the reactive mesogen, based on a total weight of the first alignment layer or the second alignment layer, respectively.

7. The method of claim 4, wherein at least one of the first alignment layer and the second alignment layer comprises about 0.01 percent by weight to about 1 percent by weight of the initiator, based on a total weight of the reactive mesogen.

8. The method of claim 1, wherein the first irradiating comprises:
irradiating about 0.01 joule to about 10 joules of an unpolarized UV light at the condition in which the electric field is applied to the liquid crystal layer.

9. The method of claim 8, wherein the second irradiating comprises:
irradiating about 15 joules to about 100 joules of the unpolarized UV light at the condition in which the electric field is not applied to the liquid crystal layer.

10. The method of claim 9, further comprising:
third irradiating about 0.1 J to about 1 J of the unpolarized UV light at the condition in which the electric filed is not applied to the liquid crystal layer, before the first irradiating.

11. A liquid crystal display device comprising:
a first substrate comprising:
a black matrix disposed on a base substrate including a switching element disposed thereon,
a color filter disposed on the switching element,
a pixel electrode electrically connected to the switching element, and
a first alignment layer disposed on the pixel electrode;
a second substrate opposite to the first substrate and comprising:
a common electrode facing the pixel electrode, and
a second alignment layer disposed on the common electrode;
a liquid crystal layer interposed between the first substrate and the second substrate; and
a cured reactive mesogen layer disposed outside of and directly adjacent to an outer surface of at least one of the first alignment layer and the second alignment layer,
wherein
the cured reactive mesogen layer disposed outside of and directly adjacent to the outer surface of at least one of the first alignment layer and the second alignment layer determines directionality of the liquid crystal layer directly adjacent thereto different from directionality of the liquid crystal layer further therefrom under a condition when no electric field is applied to the liquid crystal layer after forming the cured reactive mesogen layer,
the liquid crystal layer is separate from the cured reactive mesogen layer disposed outside of and directly adjacent to the outer surface of at least one of the first alignment layer and the second alignment layer after light is irradiated onto the second substrate and onto the liquid crystal layer between the first substrate and the second substrate,
after the light is irradiated onto the second substrate and onto the liquid crystal layer,
the first alignment layer or the second alignment layer comprises unreacted mesogen therein, and
the cured reactive mesogen layer is disposed outside of and directly adjacent to the outer surface of the first alignment layer or the second alignment layer comprising the unreacted mesogen therein, and the irradiating the light onto the second substrate and onto the liquid crystal layer comprises:

first irradiating the light at a condition in which an electric field is applied to the liquid crystal layer, and second irradiating the light at a condition in which an electric field is not applied to the liquid crystal layer, after the first irradiating.

12. The LCD device of claim 11, wherein the cured reactive mesogen layer comprises an initiator to promote a curing reaction of the reactive mesogen.

13. The LCD device of claim 12, wherein the initiator comprises at least one selected from the group consisting of benzyl dimethyl ketal, α-amino acetophenone, and 1-hydroxy cyclohexyl phenyl keton.

14. The LCD device of claim 11, wherein the reactive mesogen comprises a compound represented by the following Chemical Formula 1, $Y_1$-$A_1$-$Y_2$    <Chemical Formula 1> wherein each of $Y_1$ and $Y_2$ represents an acrylate group or a methacrylate group, A1 represents a biphenyl group, a terphenyl group, or a naphthalene group, and each hydrogen atom of A1 may be replaced with F, Cl, CH3, or OCH3.

15. The LCD device of claim 11, wherein the pixel electrode comprises a first pixel electrode and a second pixel electrode which receive different pixel voltages, respectively.

16. The LCD device of claim 11, wherein the cured reactive mesogen layer arranges a long axis of the liquid crystal molecules directly adjacent thereto, tilted, when an electric field is not applied to the liquid crystal layer.

17. The LCD device of claim 16, wherein the cured reactive mesogen layer arranges the long axis of the liquid crystal molecules of the liquid crystal layer further than the liquid crystal molecules of the liquid crystal layer directly adjacent thereto, in a direction substantially perpendicular with respect to the base substrate, when the electric field is not applied to the liquid crystal layer.

* * * * *